United States Patent
Jarrossay et al.

(10) Patent No.: US 11,867,091 B2
(45) Date of Patent: Jan. 9, 2024

(54) TURBINE NOZZLE HAVING BLADING MADE OF CERAMIC MATRIX COMPOSITE THROUGH WHICH A METAL VENTILATION CIRCUIT PASSES

(71) Applicants: SAFRAN AIRCRAFT ENGINES, Paris (FR); SAFRAN CERAMICS, Le Haillan (FR)

(72) Inventors: Clément Jarrossay, Moissy-Cramayel (FR); Sébastien Serge Francis Congratel, Moissy-Cramayel (FR); Aurélien Gaillard, Moissy-Cramayel (FR); David René Pierre Le Cair, Moissy-Cramayel (FR); Matthieu Arnaud Gimat, Moissy-Cramayel (FR)

(73) Assignees: SAFRAN AIRCRAFT ENGINES, Paris (FR); SAFRAN CERAMICS, Le Haillan (FR)

( * ) Notice: Subject to any disclaimer, the term of this patent is extended or adjusted under 35 U.S.C. 154(b) by 83 days.

(21) Appl. No.: 17/766,711

(22) PCT Filed: Oct. 1, 2020

(86) PCT No.: PCT/FR2020/051722
§ 371 (c)(1),
(2) Date: Apr. 5, 2022

(87) PCT Pub. No.: WO2021/069816
PCT Pub. Date: Apr. 15, 2021

(65) Prior Publication Data
US 2023/0313695 A1 Oct. 5, 2023

(30) Foreign Application Priority Data
Oct. 7, 2019 (FR) .................................... 1911098

(51) Int. Cl.
*F01D 9/04* (2006.01)
*F01D 9/06* (2006.01)
*F01D 11/00* (2006.01)

(52) U.S. Cl.
CPC ............. *F01D 9/042* (2013.01); *F01D 9/041* (2013.01); *F01D 9/065* (2013.01); *F01D 11/003* (2013.01);
(Continued)

(58) Field of Classification Search
CPC .......... F01D 9/042; F01D 9/041; F01D 9/065; F01D 11/003; F05D 2240/128;
(Continued)

(56) References Cited

U.S. PATENT DOCUMENTS 9,822,655 B2    11/2017  Beaujard et al.
2002/0127097 A1  9/2002  Darolia et al.
(Continued)

FOREIGN PATENT DOCUMENTS

EP    1 239 119 A1   9/2002
EP    3 034 802 A1   6/2016
FR    2 979 662 A1   3/2013

OTHER PUBLICATIONS

International Search Report dated Dec. 1, 2020 in PCT/FR2020/051722 filed Oct. 1, 2020, therein, 2 pages.
(Continued)

*Primary Examiner* — Brandon D Lee
(74) *Attorney, Agent, or Firm* — Oblon, McClelland, Maier & Neustadt, L.L.P.

(57) ABSTRACT

A nozzle for a turbomachine turbine. The nozzle includes blades made of ceramic matrix composite material, and at least one metal liner passing through a respective blade. The liner is connected in a sealed manner to a metal internal shroud so as to guide a ventilation fluid through the blade.
(Continued)

The nozzle can be configured to maintain effective sealing in spite of the different thermal expansions of the blade and of the internal shroud.

10 Claims, 6 Drawing Sheets

(52) U.S. Cl.
CPC .... *F05D 2240/128* (2013.01); *F05D 2240/55* (2013.01); *F05D 2300/6033* (2013.01); *F05D 2300/614* (2013.01)

(58) Field of Classification Search
CPC ......... F05D 2240/55; F05D 2300/6033; F05D 2300/614
See application file for complete search history.

(56) References Cited

U.S. PATENT DOCUMENTS

| | | | |
|---|---|---|---|
| 2010/0068034 A1* | 3/2010 | Schiavo | F01D 5/284 29/889.22 |
| 2010/0183435 A1 | 7/2010 | Campbell et al. | |
| 2016/0177761 A1 | 6/2016 | Huizenga et al. | |
| 2020/0088051 A1 | 3/2020 | Huizenga et al. | |

OTHER PUBLICATIONS

French Preliminary Search Report (with English translation of Categories of Cited Documents) dated Apr. 28, 2020 in French Application 1911098 filed on Oct. 7, 2019 therein, 2 pages.

* cited by examiner

TURBINE NOZZLE HAVING BLADING MADE OF CERAMIC MATRIX COMPOSITE THROUGH WHICH A METAL VENTILATION CIRCUIT PASSES

TECHNICAL FIELD

The invention relates to the field of turbine engine turbines, particularly for an aircraft propulsion assembly. The invention relates more specifically to a nozzle of such a turbine, comprising blading made of ceramic matrix composite material.

PRIOR ART

A ceramic matrix composite material, hereinafter referred to using the expression "CMC material" or "CMC", generally comprises a fibrous reinforcement and a ceramic, or partially ceramic, material. A CMC is a thermostructural composite capable of withstanding relatively high thermal stress and having a relatively low density, in particular less than that of metallic materials conventionally used to produce turbine engine turbine components.

In the aeronautical field, making turbine blades from CMC has been proposed. For example, the document FR 2 979 662 describes a turbine nozzle comprising CMC stator vanes. Such a nozzle makes it possible to reduce the quantity of ventilation air used compared to a nozzle having metallic vanes, which helps enhance the performances of the turbine engine.

In a conventional aeronautical turbine, the ventilation air is typically extracted at a compressor of the turbine engine and conveyed in the turbine to particularly cool the stator vanes, exposed to combustion gases, as well as the disks of the rotor wheels of this turbine. For this purpose, the stator vanes typically comprise an inner channel wherein ventilation air is introduced, and a series of ports opening, on one hand, into this inner channel and, on the other, at the leading edge or trailing edge.

To cool the disks, a portion of the ventilation air is generally conveyed via the inner channel of at least a portion of the stator vanes of the turbine to a central cavity wherein rotor disk hubs particulariy extend.

The CMC stator vanes of such a nozzle are generally connected to a metallic inner ring shell of this nozzle. However, a CMC material typically has a thermal expansion coefficient approximately three times lower than that of the metal alloys used in a conventional aeronautical turbine. The differential thermal expansion of the CMC vanes and the metallic inner ring shell causes gaps between these parts during turbine engine operation, and thus produces a tightness defect. Indeed, such gaps allow a leakage of ventilation air and an introduction of combustion gas into the central cavity.

DESCRIPTION OF THE INVENTION

The aim of the invention is that of providing a turbine engine turbine nozzle comprising vanes made of ceramic matrix composite material and making it possible to remedy the tightness defect of a conventional nozzle having CMC blading.

For this purpose, the invention relates to a turbine engine turbine nozzle extending about a longitudinal central axis, this nozzle comprising a radially outer ring shell made of metallic material extending about said longitudinal central axis, a radially inner ring shell made of metallic material concentric with the radially outer ring shell, and a plurality of vanes made of ceramic matrix composite material in succession circumferentially about the longitudinal central axis, each vane extending radially between the radially inner ring shell and the radially outer ring shell, each vane having a hollow profile forming an inner recess opening onto a radially inner end and a radially outer end of this vane.

According to the invention, this nozzle comprises at least one liner made of metallic material forming a radial channel for conveying ventilation air passing through the inner recess of respectively one of the vanes, this liner comprising a radially outer end attached to the radially outer ring shell and a radially inner end which engages with the radially inner ring shell such that the radial channel is facing a respective opening of the radially inner ring shell to convey the ventilation air through this opening, the nozzle comprising at least one seal disposed between the radially inner ring shell and the liner so as to ensure the tightness between the radial channel and said opening of the radially inner ring shell.

The nozzle according to the invention can therefore comprise one or more liners and, consequently, one or more radial channels formed by these liners. When the nozzle comprises a single radial channel, it passes through the recess of one of the vanes. The expression "at least one liner forming a radial channel passing through the inner recess of respectively one of the vanes" means that, when the nozzle comprises several liners and therefore several radial channels, each of these radial channels passes through the inner recess of a different vane from the vane in which the inner recess is passed through by another radial channel. Furthermore, this wording is not exclusive for embodiments wherein a given vane is passed through by several radial channels, the latter belonging in this case to different groups of radial channels, the expression "at least one liner forming a radial channel" referring to at least one radial channel of one of these groups.

The nozzle according to the invention can further comprise one or more seals. Regardless of the number of liners, there is at least one seal disposed between the radially inner ring shell and each of the liners. In the embodiments described hereinafter, each liner is considered to be associated with a single seal such that each seal is disposed between the radially inner ring shell and a respective liner to ensure the tightness between the radial channel formed by this liner and the corresponding opening of the radially inner ring shell. The invention also includes embodiments wherein several seals are inserted between the radially inner ring shell and a given liner, and embodiments wherein a given seal is inserted between the radially inner ring shell and several liners.

Hereinafter, features, functions and advantages relating to the at least one liner and to the at least one seal are described with reference to a single liner and to a single corresponding seal. Obviously, these features, functions and advantages apply to each of the liners and each of the seals when the nozzle comprises several liners and several seals.

The invention makes it possible to ensure satisfactory tightness at the radially inner ring shell, despite the differential thermal expansion of the CMC vanes and this metallic radially inner ring shell.

Indeed, such a nozzle configuration makes it possible to circulate ventilation air in a portion of a ventilation circuit which is structurally separate from the vanes, this portion of the ventilation circuit being in this instance composed of the radial channel and the corresponding opening of the radially inner ring shell. This particularly makes it possible to prevent degradation of the tightness during differential thermal expansion of the vanes and the radially inner ring shell, which produces gaps between these parts.

The liner and the radially inner ring shell both being metallic, these parts have a substantially identical thermal expansion coefficient, which makes it possible to retain a substantially constant assembly gap between these parts during the thermal expansion thereof.

The tightness is furthermore significantly enhanced by the seal disposed between the liner and the radially inner ring shell.

Moreover, the liner being metallic, it also makes it possible to absorb the mechanical forces to which the nozzle and in particular the vanes are subjected and which tend to tilt the nozzle. Such a structural reinforcement makes it possible to relieve CMC vanes in which the allowable mechanical stress is lower than that allowable by conventional metallic vanes.

To enhance the tightness of the nozzle even further, the seal can be disposed between the radially inner ring shell and the liner such that the seal is radially compressed between the radially inner ring shell and the liner.

To do this, the liner can preferably comprise a shoulder forming a support surface radially facing a corresponding support surface of the radially inner ring shell such that the seal can be compressed radially between these support surfaces.

Indeed, on one hand, the liner extends radially in the inner recess of a vane which gives it a substantially slender shape. This results in expansion of this liner essentially in a radial direction. The liner being attached to the outer ring shell by the radially outer end thereof, the expansion thereof tends to move the radially inner end thereof radially inwards.

Moreover, the radially inner ring shell tends to expand radially outwards due to the annular shape thereof.

Consequently, the respective thermal expansion of the liner and the radially inner ring shell results in a relative radial movement of these parts which moves the radially inner end of the liner closer to the radially inner ring shell, inducing a compressive force of the seal, and therefore enhanced tightness.

In an embodiment, the seal can form a closed bead extending along an outer perimeter of the radially inner end of the liner.

Preferably, the seal can comprise braided fibres.

Braided fibres make it possible to enhance the resistance of the seal to high temperatures, in particular to a temperature of about 600° C., while giving the seal the flexibility and elasticity required.

In an embodiment, the nozzle can comprise:
a concentric annular injector support located radially inside the radially inner ring shell, this injector support comprising an intake cavity,
at least one linking member extending next to the opening of the radially inner ring shell so as to be able to convey the ventilation air passing through said opening of the radially inner ring shell to the intake cavity.

The nozzle can comprise one or more linking members in which the number and circumferential position can be linked with the number and the circumferential position of the liner(s).

Hereinafter, features, functions and advantages relating to the at least one linking member are described with reference to a single linking member. Obviously, these features, functions and advantages apply to each of the linking members when the nozzle comprises several.

In an embodiment, the linking member can be annular and can comprise a radially outer linking end connected to the radially inner ring shell, and a radially inner linking end connected to the injector support.

Preferably, said linking ends of the linking member can have a rounded shape.

Such a rounded shape allows some relative mobility of the radially inner ring shell and the injector support, while ensuring satisfactory tightness during a relative movement of these parts.

In an embodiment, the radial channel of the liner can be at least partially disposed facing the linking member.

In other words, when the nozzle comprises several liners, it can comprise a corresponding number of linking members such that each radial channel is at least partially disposed facing a respective linking member.

In an embodiment, the injector support can radially delimit the outside of an inner cavity and can comprise an injection member configured to place the intake cavity and said inner cavity in fluidic communication.

When the nozzle is associated with a rotor wheel to form a turbine stage together, the inner cavity is typically a cavity wherein the hub extends from the disk of this rotor wheel which needs to be cooled with the ventilation air.

The at least one linking member makes it possible to convey to this inner cavity and therefore to the disk hub of the rotor wheel to be cooled, via the intake cavity and the injection member, the ventilation air from the radial channel of the nozzle liner.

The invention also relates to a turbine engine turbine, this turbine comprising at least one nozzle at described above.

The turbine can particularly be a low-pressure turbine and, preferably, it can comprise several stages of which at least the first stage comprises such a nozzle.

The invention also relates to a turbine engine comprising at least such a turbine.

The invention can particularly be applied in the aeronautical field, such that the turbine engine can be a turbine engine for an aircraft propulsion assembly, the assembly therefore also covering an aircraft propulsion assembly comprising such a turbine engine as well as an aircraft equipped with such a propulsion assembly.

Further advantages and features of the invention will emerge on reading the following non-limiting detailed description.

BRIEF DESCRIPTION OF THE DRAWINGS

The following detailed description refers to the appended drawings wherein.

DETAILED DESCRIPTION OF EMBODIMENTS

The figures comprise a reference L, R and C respectively defining mutually orthogonal longitudinal, radial and circumferential directions.

Figure 1:
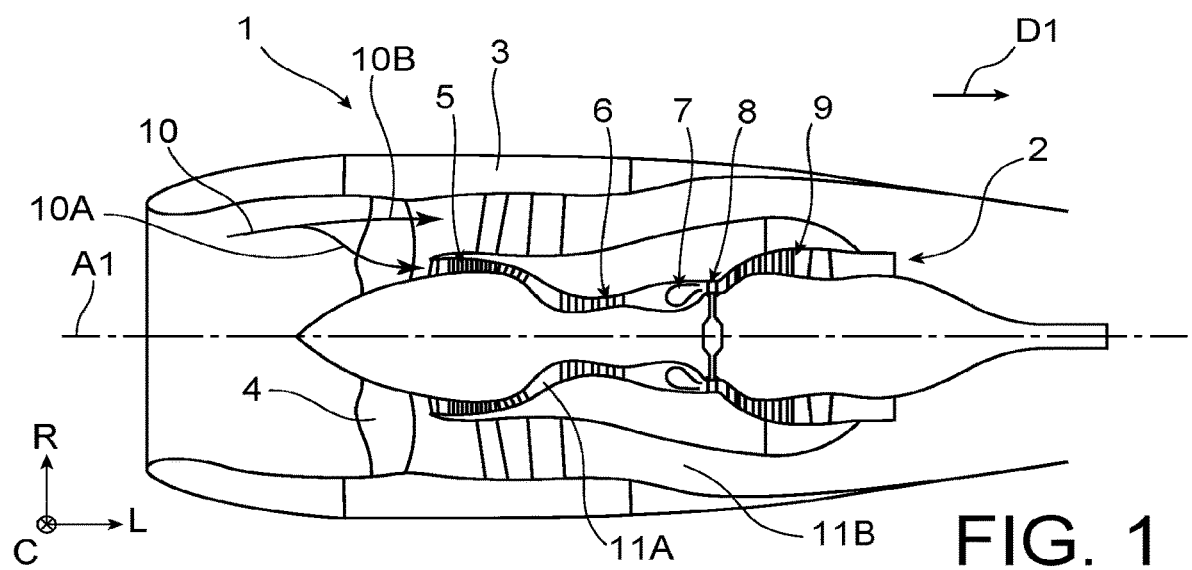
FIG. 1 is a schematic axial sectional view of an aircraft propulsion assembly according to the invention.

In FIG. 1, an aircraft propulsion assembly 1 comprising a turbine engine 2 faired by a nacelle 3 is represented. In this example, the turbine engine 2 is a dual-body and dual-flow jet engine.

Hereinafter, the terms "upstream", "downstream" are defined with respect to a main direction D1 of gas flow through the propulsion assembly 1 when the latter is propelled. The direction D1 is parallel with the longitudinal direction L.

The jet engine 2 has a longitudinal central axis A1 about which extend the various components thereof, in this instance, from upstream to downstream of the jet engine 2, a fan 4, a low-pressure compressor 5, a high-pressure compressor 6, a combustion chamber 7, a high-pressure turbine 8 and a low-pressure turbine 9. The compressors 5 and 6, the combustion chamber 7 and the turbines 8 and 9 form a gas generator.

During the operation of the jet engine 2, an air flow 10 enters the propulsion assembly 1 through an air inlet upstream from the nacelle 3, passes through the fan 4 and then is split into a central primary flow 10A and a secondary flow 10B. The primary flow 10A flows into a primary gas circulation jet 11A through the compressors 5 and 6, the combustion chamber 7 and the turbines 8 and 9. The secondary flow 10B flows for its part in a secondary jet 11B surrounding the gas generator and delimited radially outwards by the nacelle 3.

In a manner known per se, a turbine such as the high-pressure turbine 8 or the low-pressure turbine 9 includes one or more stages, each stage comprising a nozzle, also known as stator, and a rotor wheel. The nozzle of a stage comprises stator vanes configured to deflect the primary flow 10A from the combustion chamber 7 to the vanes of the rotor wheel of the same stage so as to rotate this rotor wheel. For each of the turbines 8 and 9, the nozzle(s) form a stator of the turbine, whereas the rotor wheel(s) form a rotor of the turbine.

The invention relates more specifically to a nozzle 20 belonging in this example to the first stage of the low-pressure turbine 9. Obviously, one or more stages of the low-pressure turbine 9 and/or the high-pressure turbine 8 can comprise a nozzle 20 as described hereinafter.

Figure 2:
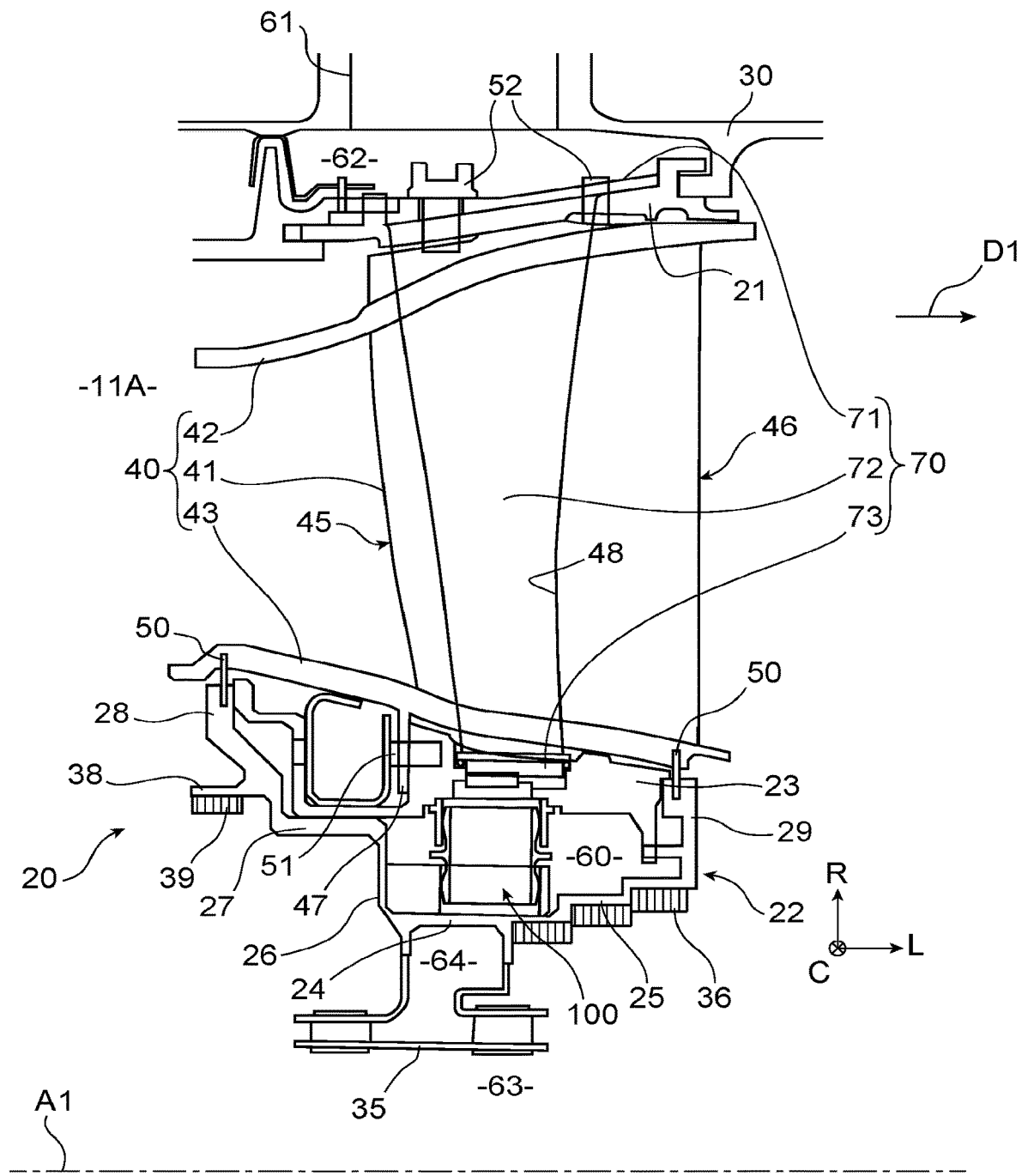
FIG. 2 is a partial schematic view of a turbine nozzle according to the invention.
Figure 3:
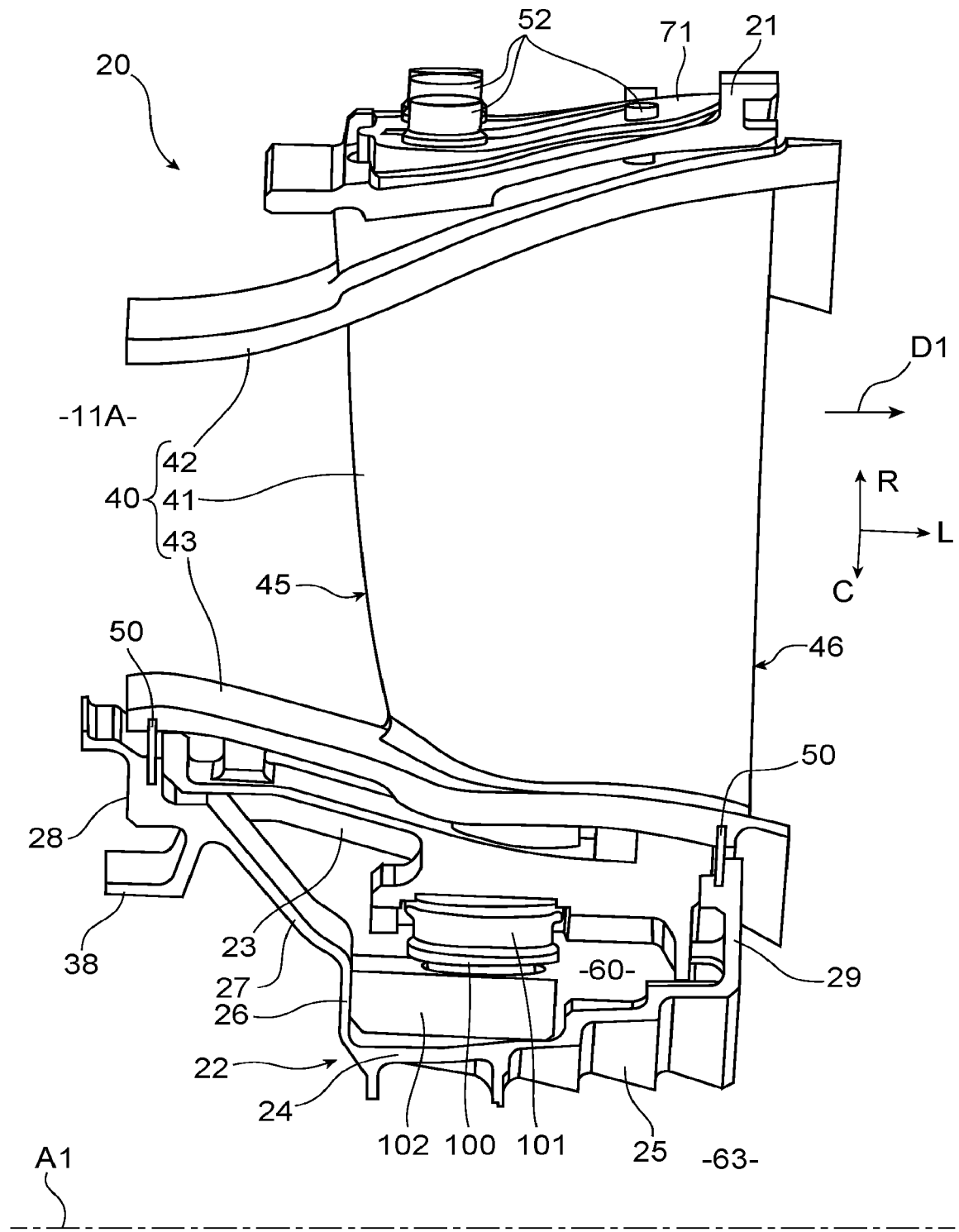
FIG. 3 is a partial schematic perspective view of a nozzle according to the invention.

With reference to FIGS. 2 and 3, the nozzle 20 comprises a radially outer ring shell 21, also referred to as "outer ring shell", and injector support 22, also referred to as "support", and a radially inner ring shell 23, also referred to as "inner ring shell", each forming a substantially annular part having as its central axis the axis A1 parallel with the longitudinal direction L.

Unless specified otherwise, the following description refers to the embodiment in FIG. 2 and the features described apply as they are to the embodiment in FIG. 3, these two embodiments essentially differing from one another by the geometry of the support 22.

The outer ring shell 21, the injector support 22 and the inner ring shell 23 are substantially concentric.

The inner ring shell 23 and the injector support 22 each extend radially inside the outer ring shell 21.

In this example, the outer ring shell 21 is fixedly mounted on a casing 30 of the turbine 9. The casing 30 and the nozzle 20 form a stator of the turbine 9.

In terms of structural configuration, the injector support 22 comprises a radially inner end 24 extending substantially along the longitudinal direction L.

The injector support 22 forms an intake cavity 64 delimited radially outwards by the radially inner end 24.

The injector support 22 bears at least one injection member 35. In this example, the injection member 35 is a conventional nozzle injector extending axially projecting from the radially inner end 24.

The injection member 35 is configured to place the intake cavity 64 and an inner cavity 63 delimited radially outwards by the injector support 22 in fluidic communication.

In an embodiment not shown, several injection members can each traverse the injector support 22 via at least one port.

Each injection member 35 makes it possible to convey ventilation air from a compressor 5 or 6 to the inner cavity 63 of the turbine 9 (see further below).

The injector support 22 also comprises a downstream portion 25, forming steps, extending downstream and radially outwards from a downstream end of the radially inner end 24. The injector support 22 bears on an inner surface of this downstream portion 25 an abradable material 36 which in a manner known per se is intended to engage with sealing elements of the rotor wheel (not shown) located downstream from the nozzle 20, so as to form a downstream dynamic seal between the inner cavity 63 and the primary jet 11A.

The injector support 22 also comprises a radial arm 26 extending radially outwards from an upstream end of the radially inner end 24, and an upstream portion 27 extending upstream from a radially outer end of the radial arm 26. In the embodiment in FIG. 2, the upstream portion 27 is substantially parallel with the longitudinal direction L. In the embodiment in FIG. 3, the upstream portion 27 is truncated.

The injector support 22 further comprises two radial arms 28 and 29 extending radially outwards respectively from an upstream end of the upstream portion 27 and a downstream end of the downstream portion 25.

The injector support 22 forms in this example a recess receiving the inner ring shell 23. The inner ring shell 23 is mounted tightly or with play between the radial arms 28 and 29. In an embodiment not shown, the inner ring shell 23 is attached to the injector support 22 by attachment means such as screws.

In this example, the injector support 22 also comprises a support element 38 bearing an abradable material 39 intended to engage with a sealing element of a rotor wheel (not shown) of the high-pressure turbine 8 located downstream from the nozzle 20, so as to form a dynamic seal between the inner cavity 63 and the primary jet 11A.

The outer ring shell 21, the injector support 22, the inner ring shell 23 and the casing 30 are made of a material enabling them to withstand relatively substantial mechanical and thermal stress, in this example a metallic material for example based on nickel or cobalt.

The nozzle 20 also comprises a plurality of vanes 40 made of ceramic matrix composite material (hereinafter "CMC") in succession circumferentially about the axis A1.

FIGS. 2 and 3 show a single vane 40, and the following description refers to this vane 40. The other vanes, not shown in these figures, are here identical to the vane 40.

In a manner known per se, the vane 40 comprises a blade 41, an outer platform 42 and an inner platform 43. The blade 41 comprises a leading edge 45 and a trailing edge 46 configured to direct the primary flow 10A from the combustion chambers 7 to vanes (not shown) of said rotor wheel located downstream from the nozzle 20.

The vane 40 extends radially between the outer ring shell 21 and the inner ring shell 23, and between the outer ring shell 21 and the injector support 22, such that the blade 41 extends through the primary jet 11A and can thus fulfil the directing function mentioned above.

In this example, the inner platform 43 of the vane 40 is connected to the injector support 22 via sealing tabs 50 allowing a relative radial translation of the injector support 22 in relation to the vane 40. The inner platform 43 of the vane 40 comprises a radial arm 47 connected to the inner ring shell 23 using pins 51 mounted with play in the vane 40 so as to allow an expansion of the pins 51 during the operation of the turbine engine 2.

The nozzle 20 according to the invention comprises a plurality of liners 70 made of metallic material, in this example identical in number to the number of vanes 40.

A single liner 70 is described hereinafter with reference to FIG. 2 and following. The other liners, not shown in these figures, are here identical to the liner 70.

Figure 4:
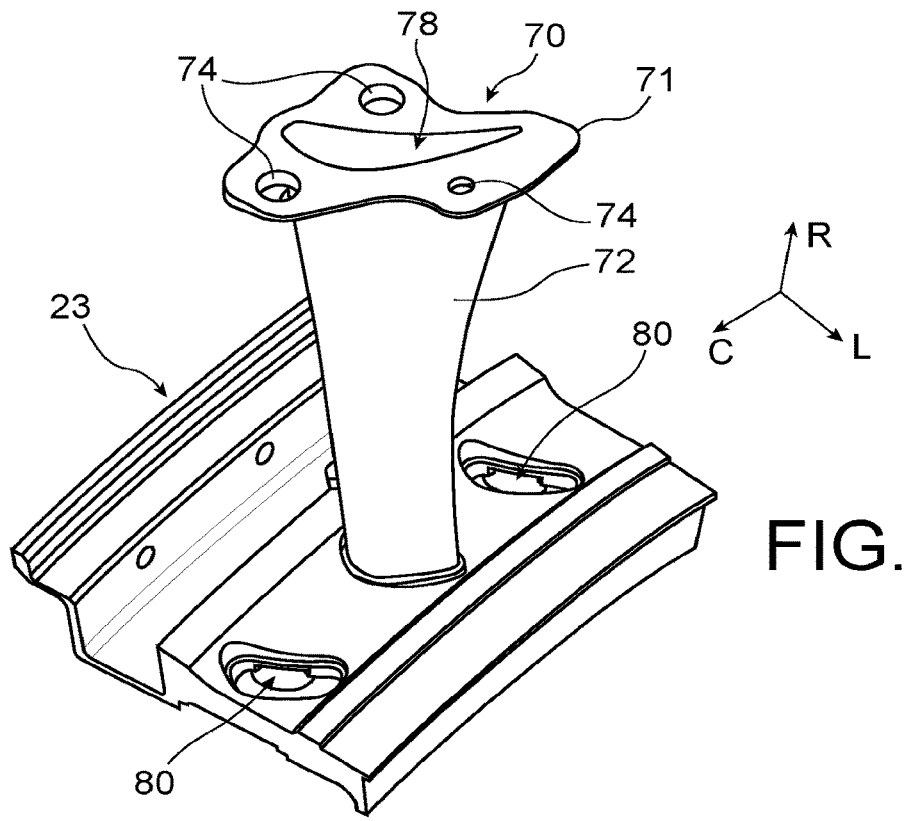
FIG. 4 is a schematic perspective view of a radially inner ring shell and a nozzle liner in FIG. 2.
Figure 5:
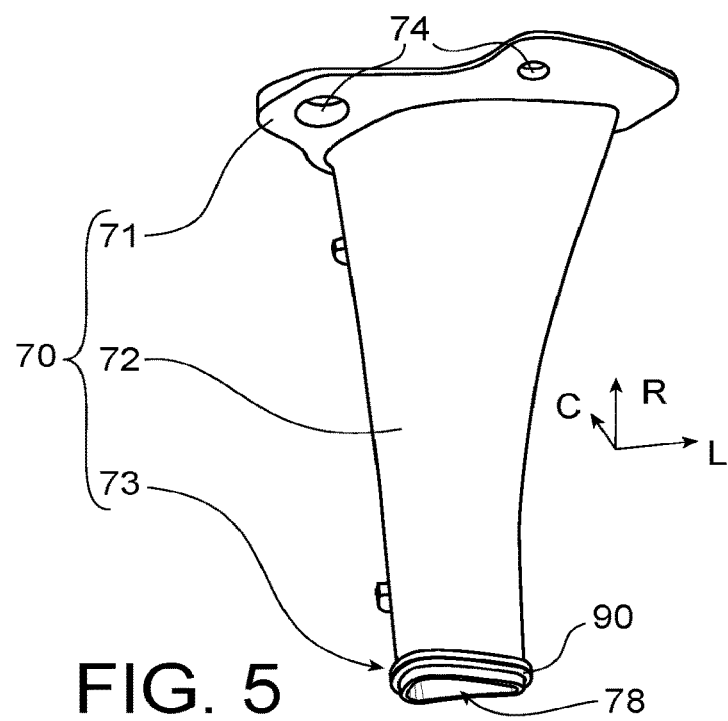
FIG. 5 is a partial schematic perspective view of a liner of the nozzle in FIG. 2, this liner comprising a radially inner end bearing a seal.

With reference to FIGS. 4 and 5, the liner 70 has an overall slender shape in the radial direction R.

The liner 70 comprises a radially outer end 71 forming a platform and a body 72 connected to the platform 71 and comprising, radially opposite the platform 71, an end forming a radially inner end 73 of this liner 70.

The body 72 of the liner 70 has a substantially flared shape along the radial direction R, having greater longitudinal L and circumferential C dimensions at the platform 71 than at the radially inner end 73.

With reference to FIG. 2, the liner 70 is attached to the outer ring shell 21 by the platform 71 thereof, using attachment means 52 such as screws engaging with linking means such as threaded ports (not shown) produced in the outer ring shell 21. The attachment means 52 pass through openings 74 provided in the platform 71 (see FIGS. 4 and 5).

The liner 70 passes through the vane 40 while being disposed in an inner recess thereof.

Indeed, the vane 40 has a hollow profile forming an inner recess 48 opening at a radially inner end and at a radially outer end of this vane 40. The inner recess 48 has a shape which corresponds substantially to that of the body 72 of the liner 70 such that the latter substantially moulds the inner recess 48 of the vane 40. Obviously, the relative dimensions of the inner recess 48 of the vane 40 and the body 72 of the liner 70 are such that these parts can move in relation to one another in the radial direction R, under the effect of the differential thermal expansion thereof.

The outer ring shell 21 also comprises an opening (not shown) the shape of which corresponds substantially to that of a radially outer portion of the body 72 of the liner 70.

With reference to FIG. 2, the body 72 of the liner 70 passes through the opening of the outer ring shell 21 and the inner recess 48 of the vane 40 such that the platform 71 thereof is radially bearing on an outer surface of the outer ring shell 21, the body 72 thereof is housed in the inner recess 48 of the vane 40 and the radially inner end 73 thereof opens outside this inner recess 48 at the inner platform 43 of the vane 40.

The liner 70 forms a radial channel 78 for conveying ventilation air.

This radial channel takes the form of a port 78 passing radially through this liner 70 on either side so as to open, on one hand, at the platform 71 and, on the other at the radially inner end 73. The shape of this port 78 is substantially similar to the outer shape of the body 72 of the liner 70 and therefore to the shape of the inner recess 48 of the vane 40.

The radially inner end 73 of the liner 70 is configured to engage with the inner ring shell 23 in the manner described hereinafter.

Figure 7:
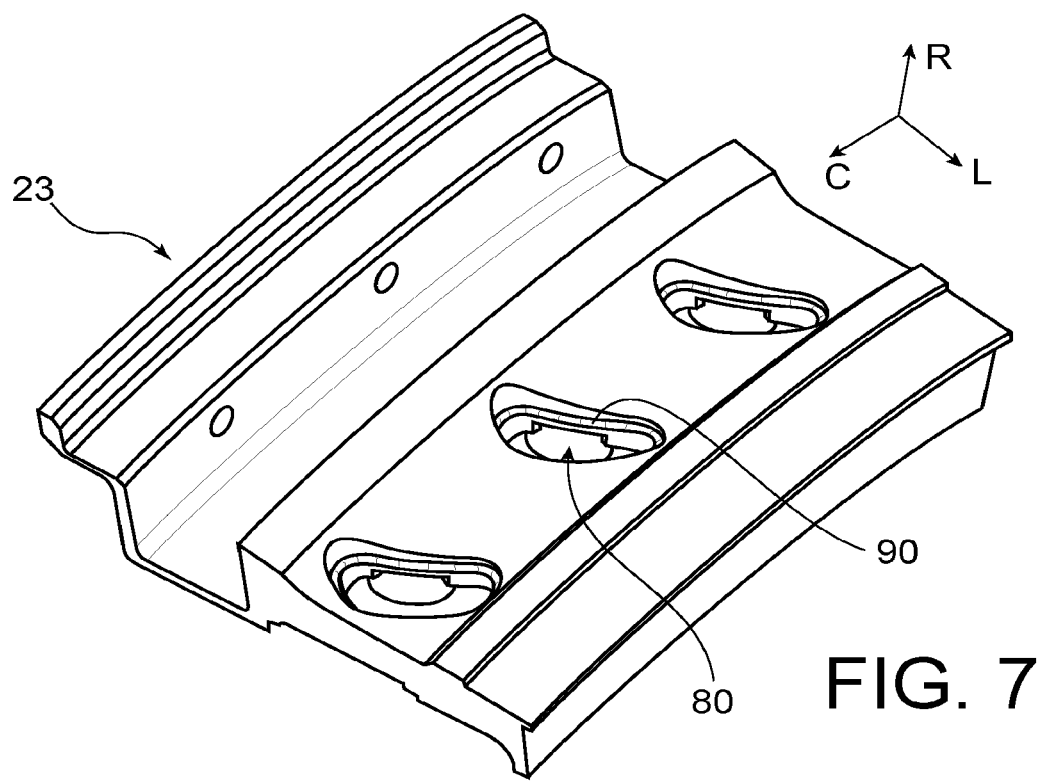
FIG. 7 is a partial schematic perspective view of the radially inner ring shell of the nozzle in FIG. 2.
Figure 8:
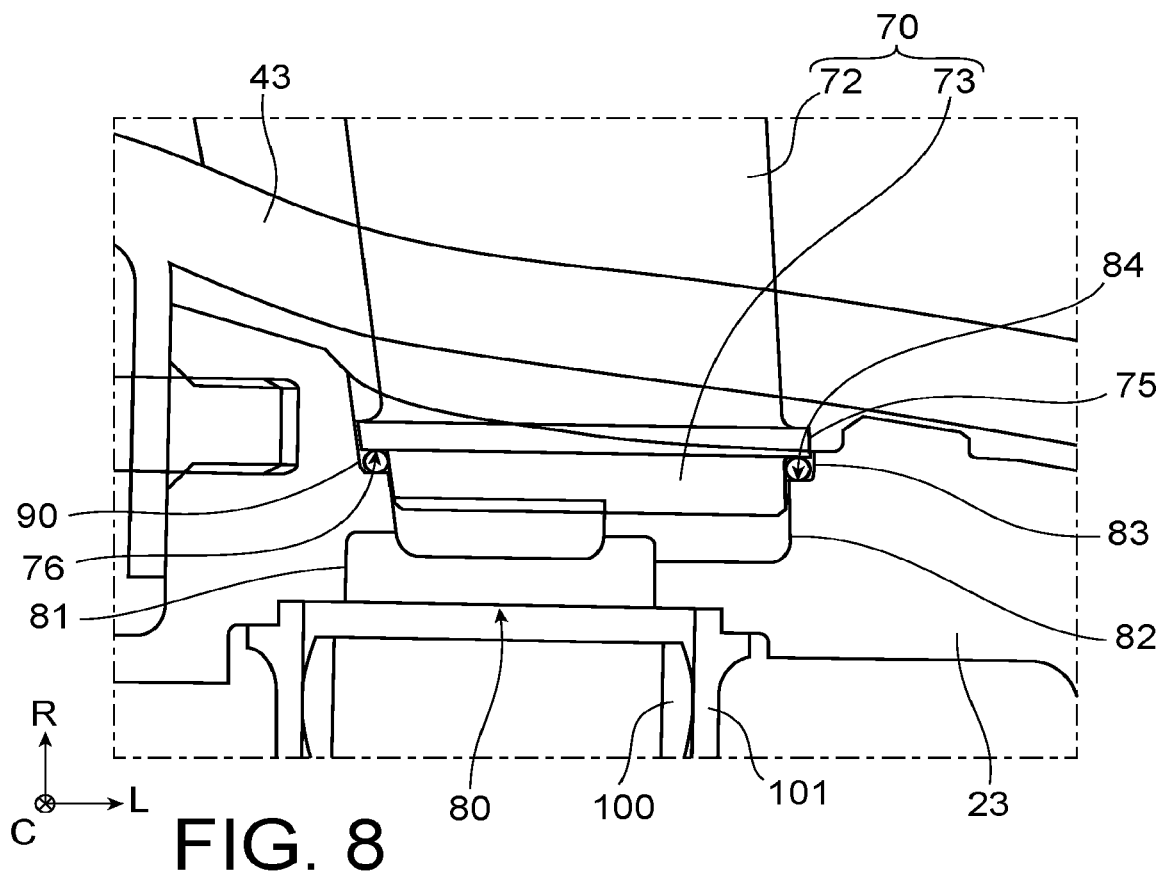
FIG. 8 is a partial schematic view of the nozzle in FIG. 2, showing a tight engagement of a liner with the radially inner ring shell of this nozzle.

With reference to FIGS. 4, 7 and 8, the inner ring shell 23 comprises openings 80, in this example identical in number to the number of liners 70.

FIGS. 4 and 7 show a section of the inner ring shell 23 comprising three openings 80.

Unless specified otherwise, a single opening 80 is described hereinafter with reference to FIG. 8. The other openings, not shown in this figure, are here identical to this opening 80.

The opening 80 passes through the inner ring shell 23 radially on either side so as to open, on one hand, onto an inner surface and, on the other, onto an outer surface of this inner ring shell 23.

In this example, the opening 80 is obtained by machining a first countersink 81 on the inner surface of the inner ring shell 23 and a second countersink 82 on the outer surface of the inner ring shell 23.

A third countersink 83 is machined on the outer surface of the inner ring shell 23 at the opening 80 so as to define a support surface 84 for a seal 90.

The liner 70 is configured such that the radial channel 78 formed thereby is facing the opening 80 of the inner ring shell 23.

Figure 6:
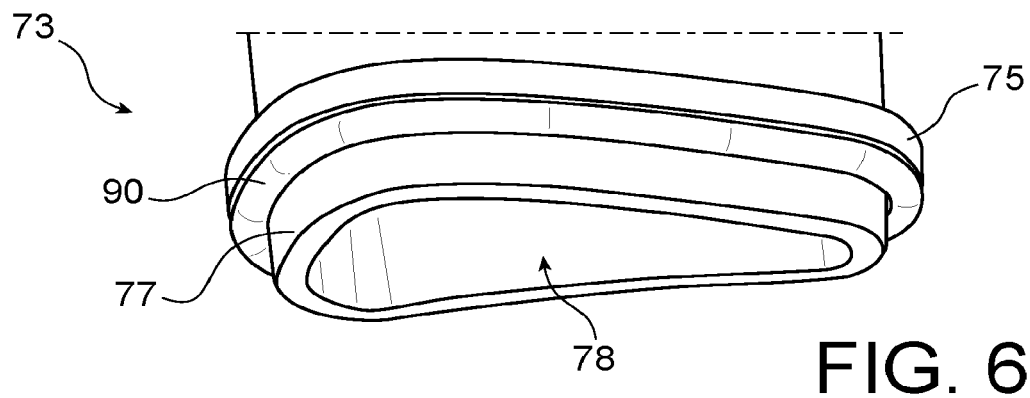
FIG. 6 is a partial schematic perspective view of the radially inner end of the liner in FIG. 5.

In this example, the radially inner end 73 of the liner 70 comprises a shoulder 75 seen in FIGS. 6 and 8, forming a support surface 76 radially facing the support surface 84 described above.

With reference to FIGS. 6 and 8, a portion 77 of the radially inner end 73, radially opposite the body 72 in relation to the shoulder 75, has a shape which corresponds substantially to the shape of the countersink 82 and is engaged in the opening 80. This portion 77 and the countersink 82 are in this example dimensioned so as to minimise the play between these parts in the longitudinal L and circumferential C directions.

FIG. 6 shows the seal 90 mounted on the liner 70. This seal 90 forms a closed bead extending along an outer perimeter of the radially inner end 73 of the liner 70, and more specifically along a part of the portion 77 of this radially inner end 73 so as to radially bear on the support surface 76 formed by the shoulder 75.

By way of illustration, FIG. 7 shows the seal 90 housed in said third countersink 83 of the opening 80, separately from the liner 70. The seal 90 bears radially on said support surface 84 formed by this third countersink 83.

FIG. 8 shows the assembly of this unit, the seal 90 being disposed between the liner 70 and the inner ring shell 23 so as to be compressed between these parts, and more specifically between the support surfaces 76 and 84.

In this example, the seal 90 comprises braided fibres.

Obviously, a seal 90 is disposed in the same way between the inner ring shell 23 and each of the other liners, not shown in the figures, around a corresponding opening 80.

With reference to FIGS. 2 and 3, the inner ring shell 23 and the injector support 22 radially delimit an annular space 60 between one another.

A plurality of linking members 100 is housed inside this annular space 60. In this example, the nozzle 20 comprises the same number of linking members 100 as liners 70.

A single linking member 100 is described hereinafter with reference to FIGS. 2, 3, 8 and 9. The other linking members, not shown in these figures, are here identical to the linking member 100.

The linking member 100 extends radially between the inner ring shell 23 and the injector support 22.

Figure 9:
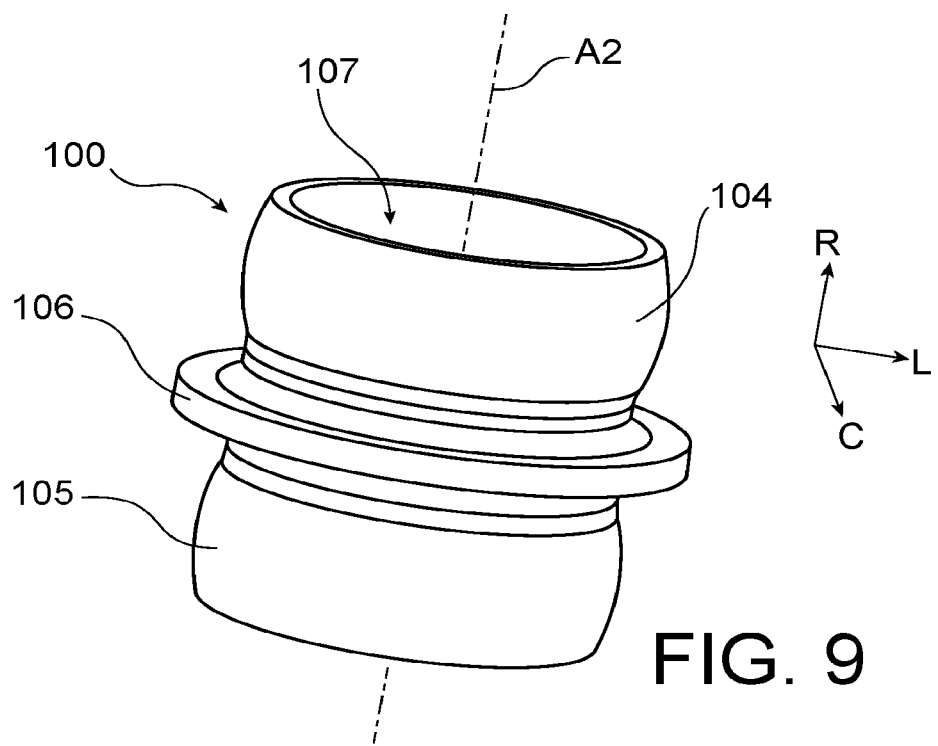
FIG. 9 is a schematic perspective view of a linking tube of the nozzle in FIG. 2.

The linking member 100 is substantially annular so as to form a linking tube as shown in FIG. 9.

This linking tube 100 has an axis of revolution A2 and comprises a radially outer linking end 104, a radially inner linking end 105 and a flange 106.

The radially outer linking end 104 and the radially inner linking end 105 are symmetrical in relation to one another in relation to a plane perpendicular to the axis A2 passing through the flange 106.

Each of the linking ends 104 and 105 of this linking tube 100 has a rounded, or semi-spherical, shape.

The linking tube 100 comprises a port 107 passing through this tube 100 on either side along the axis A2.

For each linking tube 100, the nozzle 20 comprises a first connection element 101 rigidly connected to the inner ring shell 23, and a second connection element 102 rigidly connected to the injector support 22 (see FIG. 3).

In this example, the connection elements 101 and 102 are respectively attached to the inner ring shell 23 and to the injector support 22 by brazing, which contributes to the tightness of the ventilation circuit.

The connection elements 101 and 102 each comprise a substantially cylindrical port passing through these elements radially on either side.

When the linking tube 100 is mounted on the nozzle 20, the axis of revolution A2 of the tube 100 is substantially parallel with the radial direction R, the radially outer linking end 104 is force-fitted in the port of the first connection element 101 and the radially inner end 105 is force-fitted in the port of the second connection element 102.

More generally, the linking tube 100 is at least partially disposed facing the radial channel 78 such that the port 107 of this linking tube 100 is in fluidic communication, on one hand, with the opening 80 of the inner ring shell 23 (see FIG. 8), and, on the other, with the intake cavity 64 and a respective injection member 35 (see FIG. 2).

The nozzle 20 in the FIG. 2 thus forms a ventilation circuit comprising, in the ventilation air flow direction:
- at least one supply conduit 61 produced in the casing 30 and configured to convey ventilation air extracted at the compressor 5 of the turbine engine 2 into an outer annular cavity 62 delimited radially internally by the platform 71 of each of the liners 70,
- several distribution branches configured to convey the ventilation air from this outer cavity 62 to the inner cavity 63 of the turbine 9.

Each distribution branch comprises:
- the radial channel 78 formed by one of the liners 70 passing through a respective vane 40,
- a corresponding opening 80 of the inner ring shell 23,
- a linking member 100,
- the intake cavity 64,
- a corresponding injection member 35.

For each distribution branch, the corresponding seal 90 contributes to the tightness of the ventilation circuit by preventing a leakage of ventilation air through the gaps between the radial channel 78 and the opening 80 of this distribution branch, and by preventing an introduction of combustion gas from the primary jet 11A via these gaps.

This tightness is enhanced by the compression of the seal 90 under the action of the thermal expansion of the liner 70 and the inner ring shell 23 of this distribution branch.

Obviously, the above description is in no way restrictive. For example, in an embodiment not shown, only a portion of the vanes 40 is passed through by a liner 70. In another embodiment, the nozzle 20 is configured such that the ventilation air outflowing from the radial channel(s) 78 is conveyed to one or more injection members 35 by passing through the annular space 60 without a linking member 100.

The invention claimed is:

1. A nozzle for turbine of a turbine engine extending about a longitudinal central axis, said nozzle comprising a radially outer ring shell made of metallic material extending about said longitudinal central axis, a radially inner ring shell made of metallic material concentric with the radially outer ring shell, and a plurality of vanes made of ceramic matrix composite material in succession circumferentially about the longitudinal central axis, each vane extending radially between the radially inner ring shell and the radially outer ring shell, each vane having a hollow profile forming an inner recess opening at a radially inner end and at a radially outer end of said vane, wherein said nozzle comprises at least one liner made of metallic material forming a radial channel for conveying ventilation air passing through the inner recess of respectively one of the vanes, said liner comprising a radially outer end attached to the radially outer ring shell and a radially inner end which engages with the radially inner ring shell such that the radial channel is facing a respective opening of the radially inner ring shell to convey the ventilation air through said opening, the nozzle comprising at least one seal disposed between the radially inner ring shell and the liner so as to ensure the tightness between the radial channel and said opening of the radially inner ring shell, the liner comprising a shoulder forming a support surface radially facing a corresponding support surface of the radially inner ring shell such that the seal can be compressed radially between said support surfaces.

2. The nozzle according to claim 1, wherein the seal forms a closed bead extending along an outer perimeter of the radially inner end of the liner.

3. The nozzle according to claim 1, wherein the seal comprises braided fibres.

4. The nozzle according to claim 1, said nozzle comprising:
- a concentric annular injector support located radially inside the radially inner ring shell, said injector support comprising an intake cavity,
- at least one linking member extending next to the opening of the radially inner ring shell so as to be able to convey the ventilation air passing through said opening of the radially inner ring shell to the intake cavity.

5. The nozzle according to claim 4, wherein the linking member is annular and comprises a radially outer linking end connected to the radially inner ring shell, and a radially inner linking end connected to the injector support.

6. The nozzle according to claim 5, wherein said linking ends of the linking member have a rounded shape.

7. The nozzle according to claim 4, wherein the radial channel of the liner is at least partially disposed facing the linking member.

8. The nozzle according to claim 4, wherein the injector support radially delimits the outside of an inner cavity, the injector support comprising an injection member configured to place the intake cavity and said inner cavity in fluidic communication.

9. A turbine for turbine engine, said turbine comprising at least one nozzle according to claim 1.

10. A turbine engine, comprising at least one turbine according to claim 9.

* * * * *